(12) United States Patent
Gaál et al.

(10) Patent No.: US 12,068,918 B2
(45) Date of Patent: Aug. 20, 2024

(54) METHODS AND APPARATUSES FOR MANAGING A PORT OF A NETWORK DEVICE

(71) Applicant: Telefonaktiebolaget LM Ericsson (publ), Stockholm (SE)

(72) Inventors: Géza Gaál, Budapest (HU); Balázs Varga, Budapest (HU); János Szabó, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 340 days.

(21) Appl. No.: 17/432,634

(22) PCT Filed: Feb. 27, 2019

(86) PCT No.: PCT/SE2019/050172
§ 371 (c)(1),
(2) Date: Aug. 20, 2021

(87) PCT Pub. No.: WO2020/176020
PCT Pub. Date: Sep. 30, 2020

(65) Prior Publication Data
US 2022/0150120 A1   May 12, 2022

(51) Int. Cl.
*H04L 41/0823*   (2022.01)
(52) U.S. Cl.
CPC ............... *H04L 41/0836* (2013.01)
(58) Field of Classification Search
None
See application file for complete search history.

(56) References Cited

U.S. PATENT DOCUMENTS

| 9,503,325 | B2 * | 11/2016 | Jain | H04L 41/0816 |
| 11,765,560 | B2 * | 9/2023 | Stapleford | H04W 4/38 |
| | | | | 455/456.1 |
| 11,765,568 | B2 * | 9/2023 | Velev | H04W 88/08 |
| | | | | 455/419 |
| 2010/0199343 | A1 | 8/2010 | Verma | |
| 2013/0336104 | A1 * | 12/2013 | Talla | H04L 43/16 |
| | | | | 370/216 |
| 2016/0308962 | A1 * | 10/2016 | Hegde | H04L 67/1095 |

(Continued)

FOREIGN PATENT DOCUMENTS

| CN | 104283724 A | 1/2015 |
| EP | 3 024 160 A1 | 5/2016 |

OTHER PUBLICATIONS

International Search Report and Written Opinion dated Jan. 8, 2020 in International Application No. PCT/SE2019/050172 (23 pages total).

(Continued)

*Primary Examiner* — Otis L Thompson, Jr.
(74) *Attorney, Agent, or Firm* — Rothwell, Figg, Ernst & Manbeck, P.C.

(57) ABSTRACT

A new port state (called "Limited (Lim)") and a new flag "Port-Limited") are introduced. The Port-Limited flag is used to move a port of a network device from an Enabled state to the Limited state when the line protocol status for the port goes from down to up. In one embodiment, when the port is in the Limited port state, only a predefined set of protocols can work over the port. Restriction can be defined by the administrator of the network device.

18 Claims, 5 Drawing Sheets

(56) References Cited

U.S. PATENT DOCUMENTS

| | | | | |
|---|---|---|---|---|
| 2016/0359982 A1* | 12/2016 | Shih | .................... | H04L 61/5014 |
| 2017/0351795 A1 | 12/2017 | Ghattas et al. | | |
| 2018/0041394 A1* | 2/2018 | Ozawa | ................ | H04L 41/0672 |
| 2018/0083859 A1* | 3/2018 | Barnum | ................... | H04L 69/24 |
| 2018/0219739 A1* | 8/2018 | Berry | ..................... | H04L 67/75 |
| 2018/0254985 A1* | 9/2018 | Ballard | ................ | H04L 45/583 |
| 2018/0287884 A1* | 10/2018 | Atkinson | ................ | H04L 41/14 |
| 2018/0307522 A1* | 10/2018 | Wu | ..................... | H04L 41/0886 |
| 2018/0351797 A1* | 12/2018 | Negahdar | ........... | H04L 63/0442 |
| 2019/0109764 A1* | 4/2019 | Sweeney | ............. | H04L 41/0869 |
| 2019/0296966 A1* | 9/2019 | Gao | ........................ | H04L 45/22 |
| 2020/0162285 A1* | 5/2020 | Drury | .................... | G05B 15/02 |
| 2020/0220873 A1* | 7/2020 | Adiga | .................... | H04L 63/10 |
| 2020/0245162 A1* | 7/2020 | Dion | ....................... | H04L 43/50 |
| 2023/0121523 A1* | 4/2023 | Delshadpour | ......... | H04L 1/0026 |
| | | | | 714/776 |

OTHER PUBLICATIONS

Wikipedia, "Firewall (computing)", XP055653611, Feb. 25, 2019 version, https://en.wikipedia.org/w/index.php?title=Firewall_(computing)&oldid=885039438# (8 pages total).

\* cited by examiner

METHODS AND APPARATUSES FOR MANAGING A PORT OF A NETWORK DEVICE

CROSS REFERENCE TO RELATED APPLICATION

This application is a 35 U.S.C. § 371 National Stage of International Patent Application No. PCT/SE2019/050172, filed Feb. 27, 2019.

TECHNICAL FIELD

This disclosure relates to managing one or more ports of a network device.

BACKGROUND

Today's network devices (e.g., switches, routers, bridges) face many requirements, and increased architectural complexity is typically needed to achieve these requirements. Consequently, operation and management of these network devices can be complicated.

Accordingly, there is a well recognizable trend in the telecommunications industry to simplify such operation and management (O&M) by allowing for automatic O&M of network devices. One component of automatic O&M is automatic configuration (a.k.a., "auto-configuration"), where a device's configuration (e.g., a device's port configuration) is not pre-determined, but rather is determined "on-the-fly."

For example, in case of auto-configuration, it is quite usual that some part of the configuration must be known in advance (e.g., what IGP routing protocol is used by the device, etc.), however some other configuration attributes can be determined on-the-fly (e.g., attributes that depend on the actual network scenario—e.g., which port is connected to which neighbor (UNI/NNI), etc.). Also, network inventory can be automatized, and actual network state is automatically created after the auto-configuration process without human intervention.

Currently, for managing a port on a network device, two port state variables are defined and widely used: (1) Port Administrative and (2) Port Operational. Conventionally, the Port Administrative state variable can be set to either the value ADMIN_UP (e.g., 1) or the value ADMIN_DOWN (e.g., 0), and the Port Operational state variable can be set to either the value PORT_UP (e.g., 1) or the value PORT_DOWN (e.g., 0).

Figure 1:
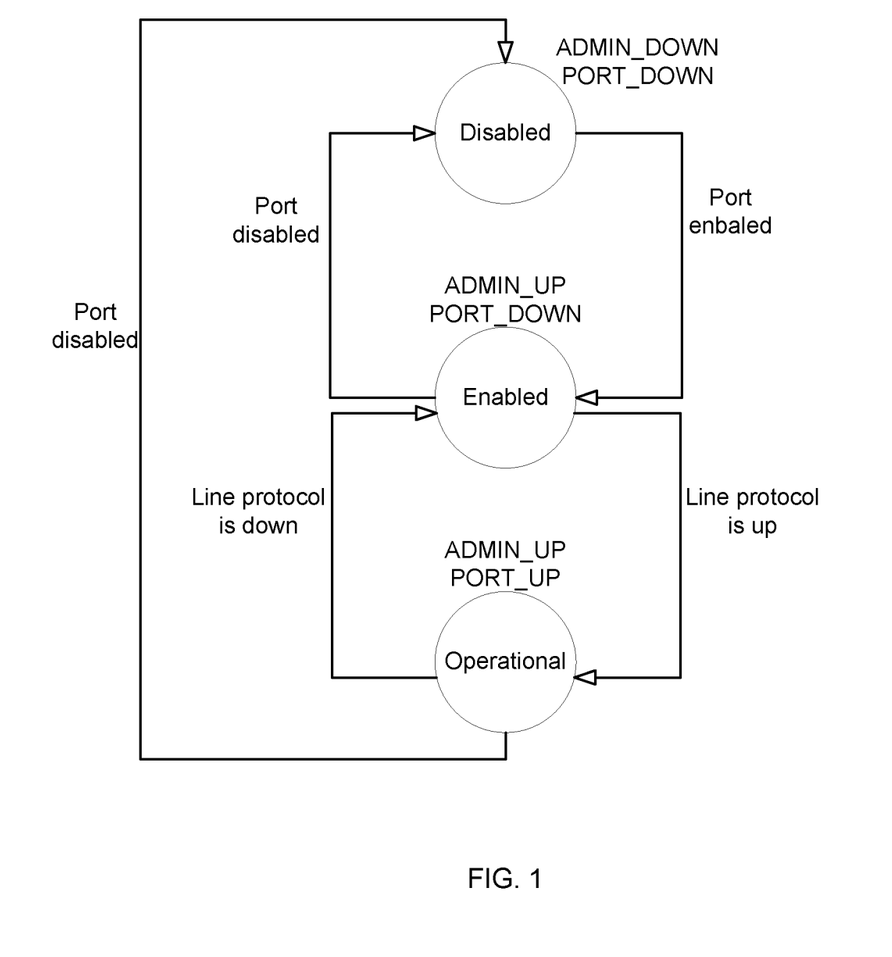
FIG. 1 shows the value of the port state variables and the transitions and their trigger between the different port states.

The related port state diagram is shown in FIG. 1. FIG. 1 shows the value of the port state variables and the transitions and their trigger between the different port states.

In the "Disable (Dis)" state the port is disabled, no communication is possible across the port and the configured protocols "do not see" the port. In the "Enabled (Ena)" state the port is enabled, however the line protocol is not working (e.g., cable is disconnected, etc.) so no communication is possible across the port and the configured protocols "do not see" the port. In the "Operational (Op)" state the port is operational, communication is possible across the port, the configured protocols can use the port according to the port's configuration attributes.

SUMMARY

Current management and operational practices assume that the port (or network device) configuration attributes are already defined when the Operational state is reached, however that may not be the case in many auto-configuration scenarios. Therefore, for example current auto-configuration solutions are rigid and complicated, as it must be ensured that no network issues arise when the port is in Operational state, but network protocols may miss some configuration attributes delivered by the auto-configuration process.

The current best practices are (1) keeping network ports fully un-configured then running a conservative/incremental auto-installation/auto-configuration process usually remote or (2) keeping the port administrative down until the auto-configuration process determines its configuration and all configuration changes are done on the port.

The problem with the first method is that it can be time consuming, and, furthermore, racing situations between protocols may arise. Additionally, due to the remote control, the network device may get stuck in an inappropriate state. The problem with the second method is that it cannot consider some dynamic information (e.g., neighbor identity, etc.) during the configuration process as no protocol interaction is possible across the disabled ports.

This disclosure introduces a new port state (called "Limited (Lim)") and a new flag that is referred to as the "Port-Limited" flag. In one embodiment, when a port of a network device is in the Limited port state, only a predefined set of certain protocols can work over the port (e.g., the protocols that are on a certain predefined list, which is referred to as the "restricted list"). Restriction can be defined by the administrator of the network device.

In one particular aspect there is provided a method for managing a port of a network device. This method includes determining the value of a Port-Limited flag associated with the port. The method also includes, when the port's current state is either Enabled or Operational, determining, based at least in part on the value of the Port-Limited flag, whether to transition the port from its current state to the Limited state. The method also includes, when the port's current state is Limited, determining, based on the value of the Port-Limited flag, whether to transition the port from the Limited state to the Operational state.

In some embodiments, when the port is in the Limited state a particular set of one or more configuration attributes for the port is obtained, and, as a result of obtaining these configuration attributes, Port-Limited is set to port-not-limited, thereby transitioning the port from the Limited state to the Operational state.

In some embodiments, when the port's current state is Operational, the step of determining whether to transition the port from its current state to the Limited state is based solely on the value of the Port-Limited flag.

In some embodiments, when the port's current state is Enabled, determining whether to transition the port from its current state to the Limited state based on the value of the Port-Limited flag and a status of a line protocol for the port. In some embodiments, it is determined to transition the port from the Enabled state to the Limited state as a result of determining that the Port-Limited flag is set to TRUE and the status value for the line protocol indicates that the line protocol is up.

In some embodiments, when the port is in the Limited state, it is determined to transition the port from the Limited state to the Operational state as a result of determining that the Port-Limited flag has been set to FALSE.

In some embodiments, when the port is in the Limited state a restricted configuration is used on the port, when the port is in the Operational state a non-restricted configuration is used on the port, and the restricted configuration is separate and distinct from the non-restricted configuration. In some embodiments, the restricted configuration comprises information instructing that the port may not be used for forwarding data plane traffic but may be used for forwarding control plane traffic. In some embodiments, the restricted configuration comprises information (e.g., access control list) identifying a set of one or more traffic types and specifying that the port may not be used for forwarding traffic of any of the identified traffic types, or the restricted configuration comprises information (e.g., access control list) identifying a set of one or more traffic types and specifying that the port may only be used for forwarding traffic of any of the identified traffic types. In some embodiments, the restricted configuration comprises a restricted list of protocols such that only the protocols identified in the restricted list may utilize the port for transmitting messages. In some embodiments, the non-restricted configuration indicates that the port may be used for forwarding any type of traffic (e.g., may be used for forwarding data plane and control plane traffic).

In another aspect there is provided another method for managing a port of a network device. This method includes obtaining a non-restricted configuration for the port; obtaining a restricted configuration for the port; applying the restricted configuration for the port when the port is in a Limited state; and applying the non-restricted configuration for the port when the port is in an operational state.

In some embodiments, the method also includes moving the port from the Limited state to the Operational state as a result of setting a Port-Limited flag associated with the port to a value of port-not-limited.

In some embodiments, the method also includes, when a Port-Limited flag associated with the port is set to a value of port-limited, moving the port from an Enabled state to the Limited state as a result of a line protocol status for the port going from down to up.

In some embodiments, the restricted configuration comprises information instructing that the port may not be used for forwarding data plane traffic but may be used for forwarding control plane traffic. In some embodiments, the restricted configuration comprises information identifying a set of one or more traffic types and specifying that the port may not be used for forwarding traffic of any of the identified traffic types, or the restricted configuration comprises information identifying a set of one or more traffic types and specifying that the port may only be used for forwarding traffic of any of the identified traffic types. In some embodiments, the restricted configuration comprises a restricted list of protocols such that only the protocols identified in the restricted list may utilize the port for transmitting messages.

In another aspect there is provided a computer program comprising instructions for adapting a network device to perform any of the methods described above.

In another aspect there is provided a network device adapted to perform any of the methods described above.

Advantageously, the Limited port state can be used effectively by an auto-configuration processes. For example, an auto-configuration process can define flexible conditions and port related policies to collect configuration attributes used later in the Operational state. Furthermore, it helps to create efficient network device local processes that can influence configuration of the device. The network device is able to automatically and dynamically change port statuses and the list of applicable policies.

BRIEF DESCRIPTION OF THE DRAWINGS

The accompanying drawings, which are incorporated herein and form part of the specification, illustrate various embodiments.

DETAILED DESCRIPTION

Figure 2:
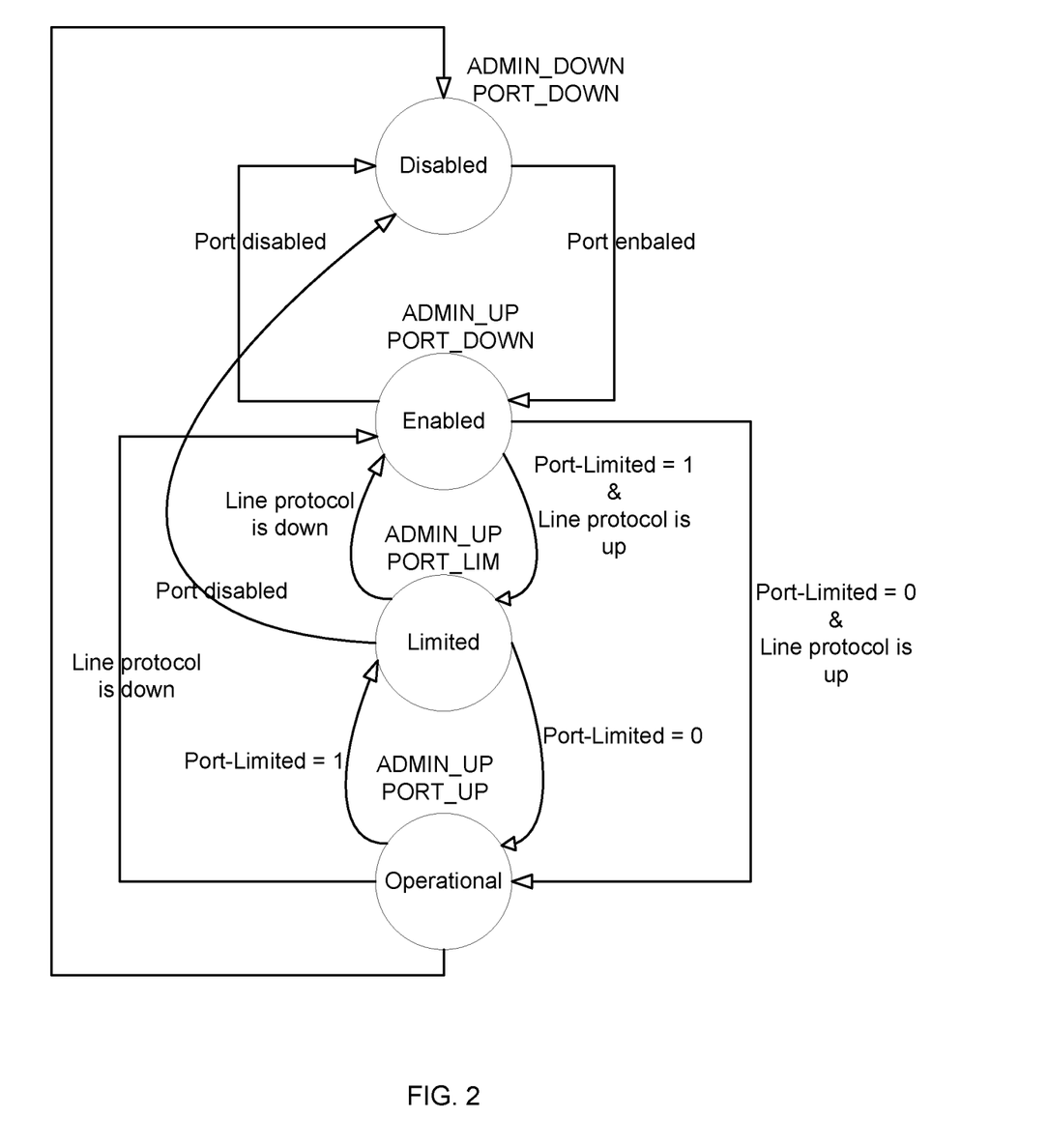
FIG. 2 illustrates an updated port state diagram according to an embodiment.

As mentioned above, this disclosure introduces the Limited port state and the Port-Limited flag, which controls the state transition towards/from the Limited port state. In one embodiment, the Port-Limited flag can be set to either the value of port-limited (e.g., 1 or TRUE) or port-not-limited (e.g. 0 or FALSE). Additionally, in the embodiments described herein, the Port Operational state variable is set to the value PORT LIM (e.g., 2) whenever the port transitions to the Limited state. FIG. 2 illustrates the updated port state diagram.

Assuming the line protocol status for the port is up (e.g., the Data Link layer(s) protocols on the port are functioning correctly), the Port-Limited flag determines whether or not a port (also known in the art as "a network interface" or "interface" for short) will enter the Limited state or Operational state. As illustrated in FIG. 2, a port will enter the Limited state only when Port-Limited is set to the value of port-limited (e.g., 1 or TRUE). That is, if Port-Limited is set to port-not-limited (e.g., 0 or FALSE), then the port does not use the Limited state and from operational perspective fallbacks to the current port state diagram (shown in FIG. 1.).

As further illustrated in FIG. 2, if a port is in the Enabled state, the port will move to the Limited state if: i) Port-Limited is set to port-limited and ii) the line protocol is up; and, if the port is in the Operational state, then the port will move to the Limited state as soon as Port-Limited is changed from port-not-limited to port-limited.

As further illustrated in FIG. 2, the port leaves the Limited state as a result of: i) the port being disabled (in this case the port moves from the Limited state to the Disabled state); ii) the line protocol going down (in this case the port moves from the Limited state to the Enabled state); and iii) Port-Limited is set to port-not-limited (in this case the port moves from the Limited state to the Operational state and Port Operational is set to PORT_UP). According to an embodiment, the network device behaviors for ports in the Limited state are defined as below:

(1) configuration defined in the configuration file of the network device are not used for the port;

(2) a separate restricted configuration is used on the port; and (3) when moving from Limited to Operational state the configuration in the configuration file may or may not be changed (e.g., merged with the restricted configuration, updated based on information received in during the Limited state, etc.).

How the restricted configuration in the Limited state is determined can be done by, for example, management system, a local entity (e.g., auto-installation agent, etc.), manually or any other kind of methods. For example, a local software entity (e.g., auto-installation agent) can define its own sub-states while the port is in Limited state and apply multiple conditions, rules and policies for the port. It can determine neighboring network device(s) and decide what role (e.g., UNI or NNI) the given port should have in Operational state and adapt the port configuration to that role. Security configuration of the network device may be also dependent on neighboring devices (e.g., whether they are authenticated or not). Furthermore, such a software entity can also activate only certain protocols (e.g., DHCP) to receive configuration related parameters that should be applied to the port (e.g., area-ID) or the network device (e.g., IS-IS Net-ID).

As shown above, by introducing the Limited port state, it is possible to apply a restricted set of protocols to the port when the port is in the Limited state. Accordingly, introducing the Limited state allows easy implementation of auto-installation and/or auto-configuration functions, thereby simplifying operation and maintenance significantly.

Figure 3:
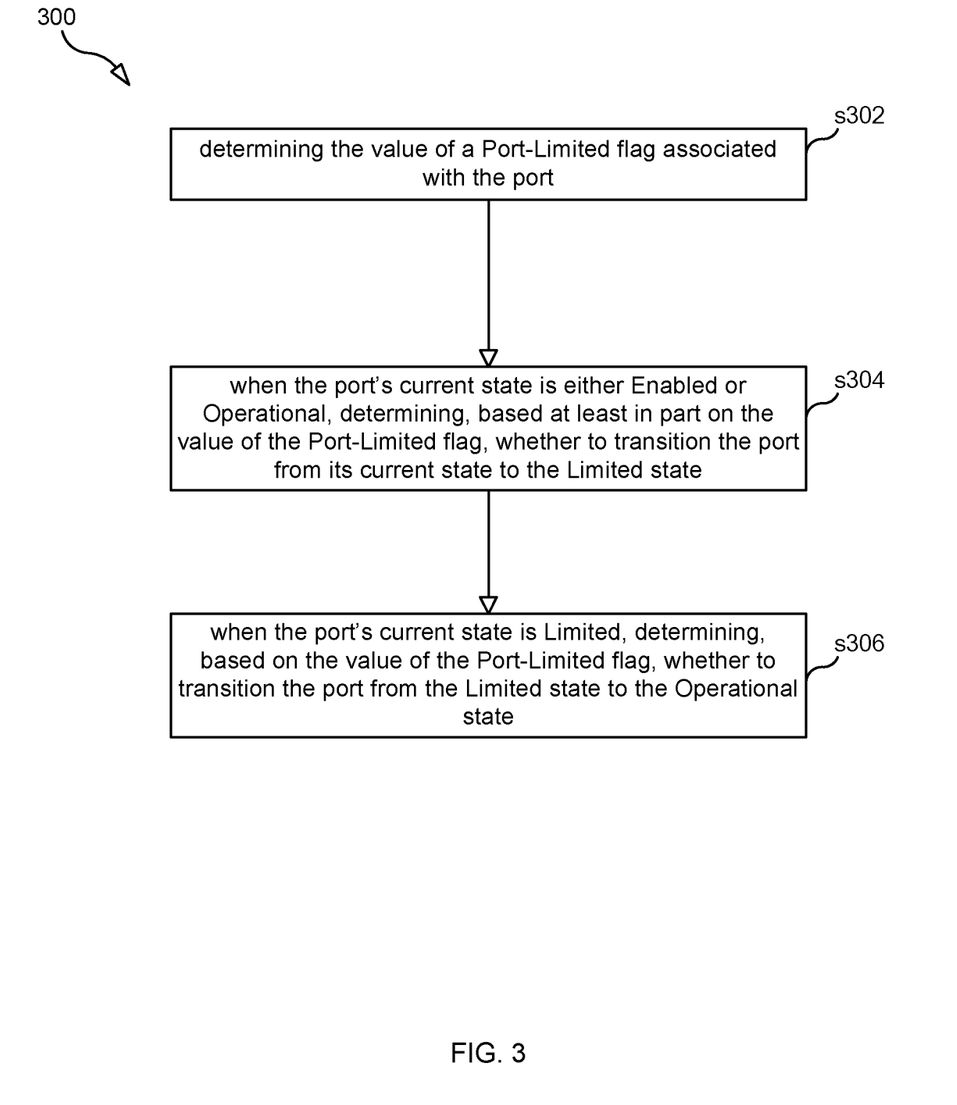
FIG. 3 is a flow chart illustrating a process according to an embodiment.

FIG. 3 is a flow chart illustrating a process 300, according to an embodiment, for managing a port of a network device. Process 300 may begin in step s302.

Step s302 comprises determining the value of a Port-Limited flag associated with the port.

Step s304 comprises, when the port's current state is either Enabled or Operational, determining, based at least in part on the value of the Port-Limited flag, whether to transition the port from its current state to the Limited state.

Step s306 comprises, when the port's current state is Limited, determining, based on the value of the Port-Limited flag, whether to transition the port from the Limited state to the Operational state.

In some embodiments, when the port is in the Limited state a particular set of one or more configuration attributes for the port is obtained, and, as a result of obtaining these configuration attributes, Port-Limited is set to port-not-limited, thereby transitioning the port from the Limited state to the Operational state.

In some embodiments, when the port's current state is Operational, the step of determining whether to transition the port from its current state to the Limited state is based solely on the value of the Port-Limited flag.

In some embodiments, when the port's current state is Enabled, the step of determining whether to transition the port from its current state to the Limited state is based on the value of the Port-Limited flag and a status of a line protocol for the port. In some embodiments, it is determined to transition the port from the Enabled state to the Limited state as a result of determining that the Port-Limited flag is set to TRUE and the status value for the line protocol indicates that the line protocol is up.

In some embodiments, when the port is in the Limited state, it is determined to transition the port from the Limited state to the Operational state as a result of determining that the Port-Limited flag has been set to FALSE.

In some embodiments, when the port is in the Limited state a restricted configuration is used on the port, when the port is in the Operational state a non-restricted configuration is used on the port, and the restricted configuration is separate and distinct from the non-restricted configuration.

In some embodiments, the restricted configuration comprises information instructing that the port may not be used for forwarding data plane traffic but may be used for forwarding control plane traffic.

In some embodiments, the restricted configuration comprises information (e.g., access control list) identifying a set of one or more traffic types and specifying that the port may not be used for forwarding traffic of any of the identified traffic types, or the restricted configuration comprises information (e.g., access control list) identifying a set of one or more traffic types and specifying that the port may only be used for forwarding traffic of any of the identified traffic types.

In some embodiments, the restricted configuration comprises a restricted list of protocols such that only the protocols identified in the restricted list may utilize the port for transmitting messages.

In some embodiments, the non-restricted configuration indicates that the port may be used for forwarding any type of traffic (e.g., may be used for forwarding data plane and control plane traffic).

Figure 4:
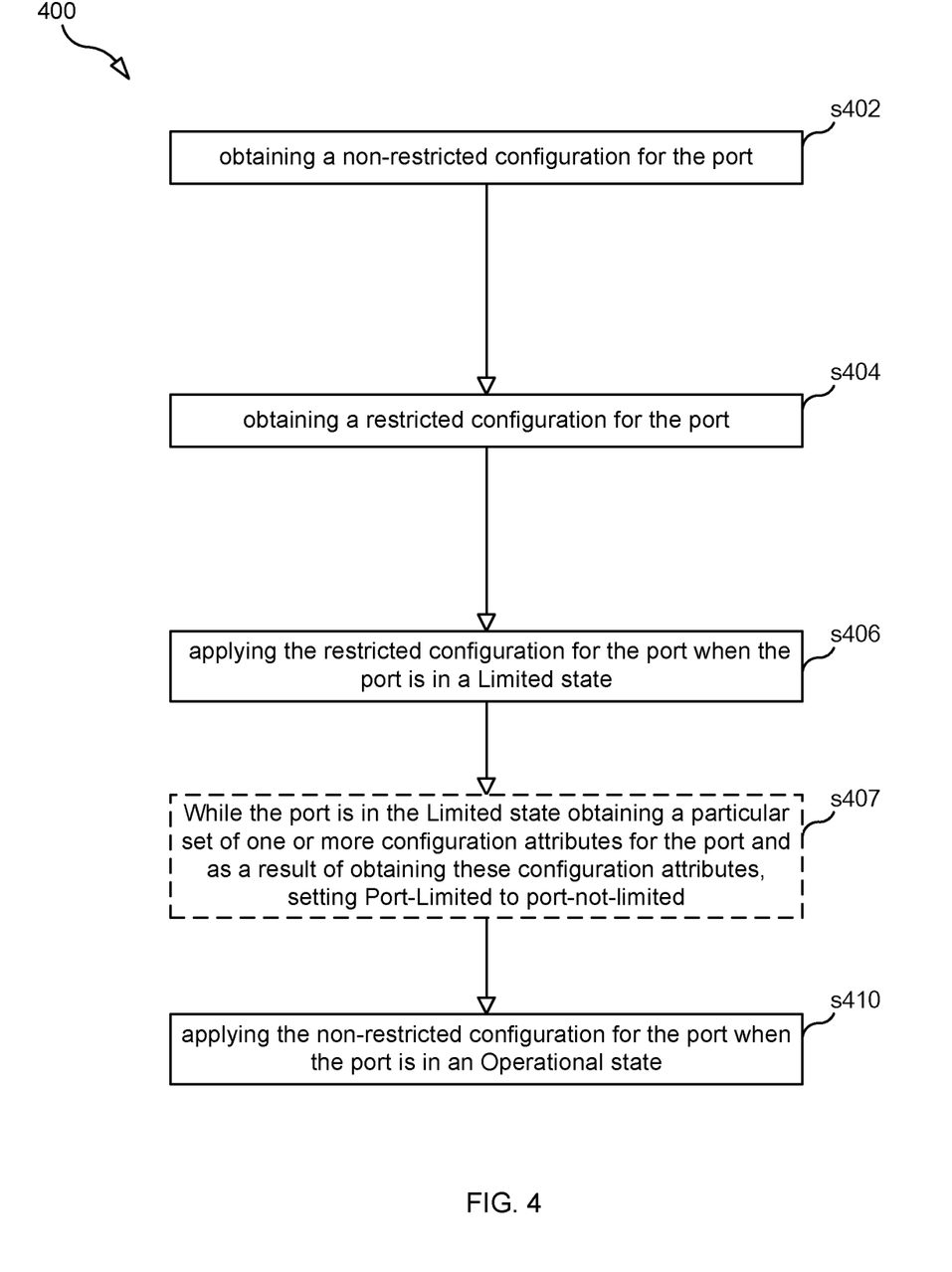
FIG. 4 is a flow chart illustrating a process according to an embodiment.

FIG. 4 is a flow chart illustrating a process 400, according to an embodiment, for managing a port of a network device. Process 400 may begin in step s402. Step s402 comprises obtaining a non-restricted configuration for the port. Step s404 comprises obtaining a restricted configuration for the port. Step s406 comprises applying the restricted configuration for the port when the port is in a Limited state. Step s408 comprises applying the non-restricted configuration for the port when the port is in an operational state. As shown in FIG. 4, in some embodiments, process 400 may also include step s407, where, while the port is in the Limited state a particular set of one or more configuration attributes for the port is obtained, and as a result of obtaining these configuration attributes, Port-Limited is set to port-not-limited, thereby transitioning the port from the Limited state to the Operational state.

In some embodiments, process 400 further includes, when a Port-Limited flag associated with the port is set to a value of port-limited, moving the port from an Enabled state to the Limited state as a result of a line protocol status for the port going from down to up.

Figure 5:
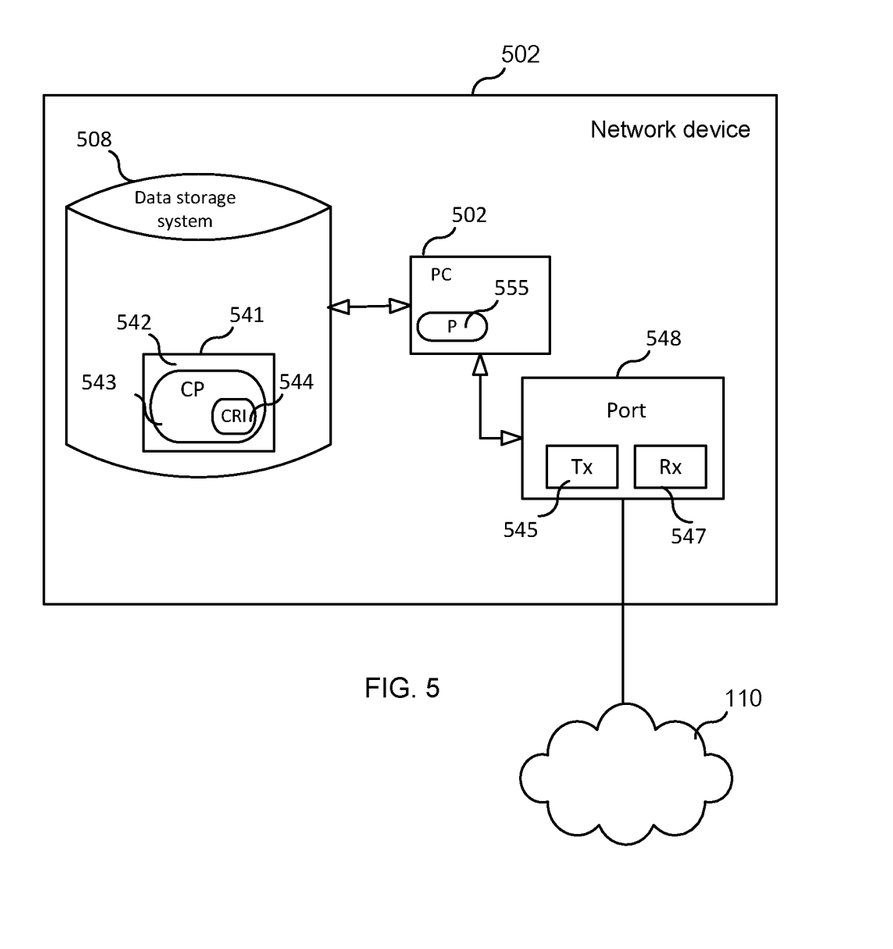
FIG. 5 is a block diagram of a network device according to some embodiments.

FIG. 5 is a block diagram of a network device 502, according to some embodiments. As shown in FIG. 5, network device 502 may comprise: processing circuitry (PC) 502, which may include one or more processors (P) 555 (e.g., one or more general purpose microprocessors and/or one or more other processors, such as an application specific integrated circuit (ASIC), field-programmable gate arrays (FPGAs), and the like); a port 548 (a.k.a., network interface) connected to a network 110 and comprising a transmitter (Tx) 545 and a receiver (Rx) 547 for enabling network device 502 to transmit data to and receive data from other devices connected to network 110; and a local storage unit (a.k.a., "data storage system") 508, which may include one or more non-volatile storage devices and/or one or more volatile storage devices. While only a single port 548 is shown, network device 502 may have multiple different ports each connected to a different network segment.

In embodiments where PC 502 includes a programmable processor, a computer program product (CPP) 541 may be provided. CPP 541 includes a computer readable medium (CRM) 542 storing a computer program (CP) 543 comprising computer readable instructions (CRI) 544. CRM 542 may be a non-transitory computer readable medium, such as, magnetic media (e.g., a hard disk), optical media, memory devices (e.g., random access memory, flash memory), and the like. In some embodiments, the CRI 544 of computer program 543 is configured such that when executed by PC 502, the CRI causes network device 502 to perform steps described herein (e.g., steps described herein with reference to the flow charts). In other embodiments, network device 502 may be configured to perform steps described herein without the need for code. That is, for example, PC 502 may consist merely of one or more ASICs. Hence, the features of the embodiments described herein may be implemented in hardware and/or software.

While various embodiments are described herein (including the Appendix, if any), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for managing a port of a network device, the method comprising:
   determining the value of a Port-Limited flag associated with the port;
   when the port's current state is either Enabled or Operational, determining, based at least in part on the value of the Port-Limited flag, whether to transition the port from its current state to a Limited state;
   when the port's current state is Limited, determining, based on the value of the Port-Limited flag, whether to transition the port from the Limited state to the Operational state;
   prior to determining the value of the Port-Limited flag, setting the value of the Port-Limited flag to TRUE;
   after setting the value of the Port-Limited flag to TRUE, obtaining configuration parameters for the port; and
   as a result of obtaining the configuration parameters for the port, setting the value of the Port-Limited flag to FALSE.

2. The method of claim 1, wherein, when the port's current state is Operational, the step of determining whether to transition the port from its current state to the Limited state is based solely on the value of the Port-Limited flag.

3. The method of claim 1, wherein, when the port's current state is Enabled, determining whether to transition the port from its current state to the Limited state based on the value of the Port-Limited flag and a status of a line protocol for the port.

4. The method of claim 3, wherein it is determined to transition the port from the Enabled state to the Limited state as a result of determining that the Port-Limited flag is set to TRUE and the status value for the line protocol indicates that the line protocol is up.

5. The method of claim 1, wherein, when the port is in the Limited state, it is determined to transition the port from the Limited state to the Operational state as a result of determining that the Port-Limited flag has been set to FALSE.

6. The method of claim 1, wherein
   when the port is in the Limited state a restricted configuration is used on the port,
   when the port is in the Operational state a non-restricted configuration is used on the port, and
   the restricted configuration is separate and distinct from the non-restricted configuration.

7. The method of claim 6, wherein the restricted configuration comprises information instructing that the port may not be used for forwarding data plane traffic but may be used for forwarding control plane traffic.

8. The method of claim 6, wherein
   the restricted configuration comprises information identifying a set of one or more traffic types and specifying that the port may not be used for forwarding traffic of any of the identified traffic types, or
   the restricted configuration comprises information identifying a set of one or more traffic types and specifying that the port may only be used for forwarding traffic of any of the identified traffic types.

9. The method of claim 6, wherein the restricted configuration comprises a restricted list of protocols such that only the protocols identified in the restricted list may utilize the port for transmitting messages.

10. The method of claim 6, wherein the non-restricted configuration indicates that the port may be used for forwarding any type of traffic.

11. A method for managing a port of a network device, the method comprising:
    obtaining a non-restricted configuration for the port;
    obtaining a restricted configuration for the port;
    applying the restricted configuration for the port when the port is in a Limited state;
    applying the non-restricted configuration for the port when the port is in an operational state;
    setting the value of a Port-Limited flag to TRUE;
    after setting the value of the Port-Limited flag to TRUE, obtaining configuration parameters for the port; and
    as a result of obtaining the configuration parameters for the port, setting the value of the Port-Limited flag to FALSE; and
    moving the port from the Limited state to the operational state as a result of i) a line protocol status for the port being up and ii) the Port-Limited flag associated with the port being set to a value of FALSE.

12. The method of claim 11, wherein the restricted configuration comprises information instructing that the port may not be used for forwarding data plane traffic but may be used for forwarding control plane traffic.

13. The method of claim 12, wherein
    the restricted configuration comprises information identifying a set of one or more traffic types and specifying that the port may not be used for forwarding traffic of any of the identified traffic types, or
    the restricted configuration comprises information identifying a set of one or more traffic types and specifying that the port may only be used for forwarding traffic of any of the identified traffic types.

14. The method of claim 12, wherein the restricted configuration comprises a restricted list of protocols such that only the protocols identified in the restricted list may utilize the port for transmitting messages.

15. The method of claim 12, wherein the non-restricted configuration indicates that the port may be used for forwarding any type of traffic (e.g., may be used for forwarding data plane and control plane traffic).

16. A non-transitory computer readable medium storing a computer program comprising instructions for configuring an apparatus to perform the method of claim 1.

17. A network device comprising:
a port;
memory; and
processing circuitry, wherein the processing circuitry is configured to:
determine the value of a Port-Limited flag associated with the port;
when the port's current state is either Enabled or Operational, determine, based at least in part on the value of the Port-Limited flag, whether to transition the port from its current state to the Limited state;
when the port's current state is Limited, determine, based on the value of the Port-Limited flag, whether to transition the port from the Limited state to the Operational state;
prior to determining the value of the Port-Limited flag, set the value of the Port-Limited flag to TRUE;
after setting the value of the Port-Limited flag to TRUE, obtain configuration parameters for the port; and
as a result of obtaining the configuration parameters for the port, set the value of the Port-Limited flag to FALSE.

18. A network device comprising:
a port;
memory; and
processing circuitry, wherein the processing circuitry is configured to:
obtain a non-restricted configuration for the port;
obtain a restricted configuration for the port;
apply the restricted configuration for the port when the port is in a Limited state;
apply the non-restricted configuration for the port when the port is in an operational state;
set the value of a Port-Limited flag to TRUE;
after setting the value of the Port-Limited flag to TRUE, obtain configuration parameters for the port; and
as a result of obtaining the configuration parameters for the port, set the value of the Port-Limited flag to FALSE; and
move the port from the Limited state to the operational state as a result of i) a line protocol status for the port being up and ii) the Port-Limited flag associated with the port being set to a value of FALSE.

* * * * *